Patented Feb. 4, 1947

2,415,377

UNITED STATES PATENT OFFICE 2,415,377

SULFURIC ACID ESTERS OF HYDROXY-ALKYLAMINO-ANTHRAQUINONES

William Wyndham Tatum, Blackley, Manchester, England, assignor to Imperial Chemical Industries Limited, a corporation of Great Britain No Drawing. Application May 3, 1943, Serial No. 485,515. In Great Britain May 11, 1942

2 Claims. (Cl. 260—379)

This invention relates to the manufacture of new anthraquinone dyestuffs useful for dyeing wool.

According to the invention we provide a process for the manufacture of the new dyestuffs which comprises treating with an agent adapted to convert aminoalcohol derivatives into their acid sulphuric esters a 1-aminoanthraquinone derivative which carries in the 4-position a substituent of the general formula

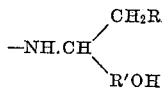

where R may be hydrogen or an alkyl radical and R' is an alkylene radical, and which may also carry in the 2-position another simple substituent, for example a chlorine or a bromine atom or a methyl group.

The 1-aminoanthraquinone derivatives which are to be converted into their acid sulphuric esters are made, for example, by interacting a 1-aminoanthraquinone containing in the 4-position an exchangeable atom or group such as halogen or alkoxy with an aliphatic hydroxyamine of the general formula

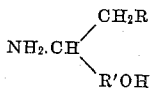

where R and R' have the significance hereinbefore ascribed thereto. As aliphatic hydroxyamines there may be instanced 2-aminopropanol, 3-amino-2-butanol and 3-amino-2-methyl-butanol. Alternatively, the 1-amino group may be introduced into an anthraquinone, which already contains the aliphatic hydroxyamine substituent in the 4-position, as by reduction of a nitro group or by hydrolysis of an acetylamino or a benzoylamino group.

The conversion into the acid sulphuric acid esters is carried out in known manner, for example, with sulphuric acid, fuming sulphuric acid or chlorosulphonic acid, or with a pyrosulphate in presence of a tertiary base such as pyridine. The acid sulphuric esters are conveniently isolated as alkali metal or ammonium salts.

On wool the new dyestuffs give very bright shades having very good levelling properties and good fastness properties, including fastness to light.

The invention is illustrated but not limited by the following examples, in which the parts are expressed by weight.

Example 1

15 parts of 2-chloro-1-amino-4-β-hydroxyisopropylaminoanthraquinone and 30 parts of sodium pyrosulphate are stirred with 100 parts of pyridine and heated at 80–100° C. for 1–2 hours. Water and 15 parts of sodium carbonate are added and the pyridine is steamed off. The so-obtained violet solution is filtered from insoluble matter, and the dyestuff is precipitated from the filtrates by addition of sodium chloride. It consists of the sodium salt of the acid sulphuric ester of 2-chloro-1-amino-4-β-hydroxyisopropylaminoanthraquinone and dyes wool from an acid bath in bright bluish-violet shades. The dyestuff is of special value in view of its very good levelling and penetrating properties.

The 2-chloro-1-amino-4-β-hydroxyisopropylaminoanthraquinone used in this example is obtained as follows:

60 parts of 2-chloro-4-bromo-1-aminoanthraquinone, 15 parts of potassium carbonate, 7.5 parts of potassium acetate and 1 part of copper acetate are added to 240 parts of nitrobenzene and 90 parts of 2-amino-n-propanol, and the mixture is heated at 100–120° C. for 16 hours. When cold, the crystals of 2-chloro-1-amino-4-β-hydroxyisopropylaminoanthraquinone are filtered off, washed with ethanol and with water and dried. The crystals are dark violet in colour, have M. P. 221–222° C. and give a bluish-violet solution in ethylene glycol monoethyl ether. Analysis: Found N 8.45%; Cl 10.5%. $C_{17}H_{15}O_3N_2Cl$ required N 8.46%; Cl 10.75%.

Example 2

1-amino-4-β-hydroxyisopropylamino-2-methylanthraquinone is converted into the sodium salt of its acid sulphuric ester by the method set forth in Example 1. It dyes wool from an acid bath in bright violet shades of excellent levelling properties.

The 1-amino-4-β-hydroxyisopropylamino-2-methylanthraquinone used in this example is obtained as follows:

36 parts of 4-bromo-1-amino-2-methylanthraquinone, 9 parts of potassium carbonate, 5 parts of potassium acetate, 0.5 part of copper acetate, 140 parts of nitrobenzene and 45 parts of 2-amino-n-propanol are stirred together at a temperature of 105–125° C. for 16 hours, the mixture is cooled, and the crystals which separate are collected by filtration. The crystals are washed with ethanol and water, and then dried. They consist of 1-amino-4-β-hydroxyisopropylamino-2-methylanthraquinone and have M. P. 223°–225° C. Analysis: Found N 9.15%. $C_{18}H_{18}O_3N_2$ requires N 9.04%.

Example 3

42 parts of 2-bromo-1-amino-4-β-hydroxyisopropylaminoanthraquinone and 70 parts of sodium pyrosulphate are introduced into 300 parts of pyridine and heated at 90° C. for 2 hours. The melt is then poured into an aqueous solution of 40 parts of sodium carbonate and the pyridine removed by steam distillation. The violet solution is filtered and the dyestuff precipitated from the filtrates by the addition of sodium chloride. It consists of the sodium salt of the acid sulphuric ester of 2-bromo-1-amino-4-β-hydroxyisopropylaminoanthraquinone and dyes wool in bright bluish-violet shades of very good levelling properties.

The 2-bromo-1-amino-4-β-hydroxyisopropylaminoanthraquinone used in this example is obtained by condensing at 90°–100° C. 76 parts of 2:4-dibromo-1-aminoanthraquinone with 100 parts of 2-aminopropanol in 240 parts of nitrobenzene in the presence of 38 parts of potassium acetate and 5 parts of cuprous chloride. When isolated as described in Example 2 it is obtained in the form of violet crystals, M. P. 201° C. These, when recrystallised from nitrobenzene have M. P. 208° C.

Example 4

5.5 parts of 2-methyl-1-amino-4-(αβ-dimethyl-γ-hydroxypropylamino)-anthraquinone are dissolved in 30 parts of pyridine and 11 parts of sodium pyrosulphate are added. The mixture is stirred at 85° C. for 2 hours. Water and 6 parts of sodium carbonate are then added and the pyridine is removed by distillation in steam. The residual liquid is filtered to remove insoluble matter and the dyestuff is precipitated from the filtrate by addition of sodium chloride. The sodium salt of the acid sulphuric ester of 2-methyl-1-amino-4-(αβ-dimethyl-γ-hydroxypropylamino)-anthraquinone is obtained as a bluish-black powder which dissolves in water to give a violet solution from which it is precipitated by addition of hydrochloric acid or caustic soda. It dyes wool in violet shades from an acid bath.

The 2-methyl-1-amino-4-(αβ-dimethyl-γ-hydroxypropylamino)-anthraquinone used in the above example is obtained as follows:

A mixture of 10 parts 4-bromo-1-amino-2-methylanthraquinone, 0.25 part cuprous chloride, 3.3 parts potassium acetate, 20 parts pyridine and 20 parts 3-amino-2-methylbutanol is stirred at a temperature of 90–100° C. for 20 hours and the resultant deep violet solution is freed from pyridine by distillation in steam. The 2-methyl-1-amino-4-(αβ-dimethyl-γ-hydroxypropylamino)-anthraquinone is isolated from the residual liquid by filtration.

Example 5

20 parts of 2-bromo-1-amino-4-β-hydroxyisopropylaminoanthraquinone are dissolved in 150 parts of 100% sulphuric acid and the solution is stirred at 20° C. for 1 hour. It is then poured into 1500 parts of ice and water containing 120 parts of caustic soda and the resultant mixture is filtered. The solid obtained is the sodium salt of the acid sulphuric ester of 2-bromo-1-amino-4-β-hydroxyisopropylaminoanthraquinone. It is washed with 2% brine and dried. It is identical with the dyestuff of Example 3. In place of the 100% sulphuric acid used in this example, there may alternatively be employed weaker acid for example of 96% strength, or there may be used fuming sulphuric acid containing about 5% of sulphur trioxide.

I claim:
1. The sulfuric acid esters of the compounds having the formula:

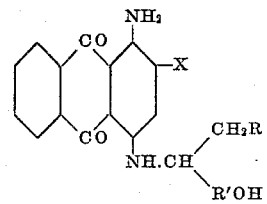

where in X stands for a substituent of the group consisting of chlorine, bromine and —CH₃, and wherein R stands for a substituent of the group consisting of hydrogen and an alkyl radical, and R' stands for an alkylene radical, the entire secondary hydroxyalkylamino group containing from 3 to 5 carbon atoms.

2. The sulfuric acid ester of the compound having the formula:

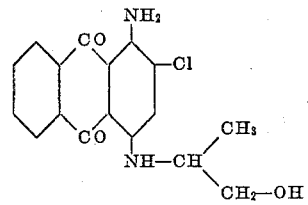

WILLIAM WYNDHAM TATUM.

REFERENCES CITED

The following references are of record in the file of this patent:

UNITED STATES PATENTS

| Number | Name | Date |
|---|---|---|
| 1,717,809 | Reddelien et al. | June 18, 1929 |
| 2,022,956 | Dreyfus | Dec. 3, 1935 |
| 1,688,553 | Olpins | Oct. 23, 1928 |

FOREIGN PATENTS

| Number | Country | Date |
|---|---|---|
| 447,037 | British | May 4, 1936 |
| 131,509 | Swiss | Feb. 15, 1929 |
| 176,930 | Swiss | May 15, 1935 |
| 210,734 | Swiss | July 3, 1940 |
| 183,883 | Swiss | Apr. 30, 1936 |
| 41,728 | Dutch | Oct. 15, 1937 |
| 473,762 | British | Oct. 18, 1937 |